G. W. LANE.
Domestic Boiler.
No. 111,067.
Patented Jan. 17, 1871.
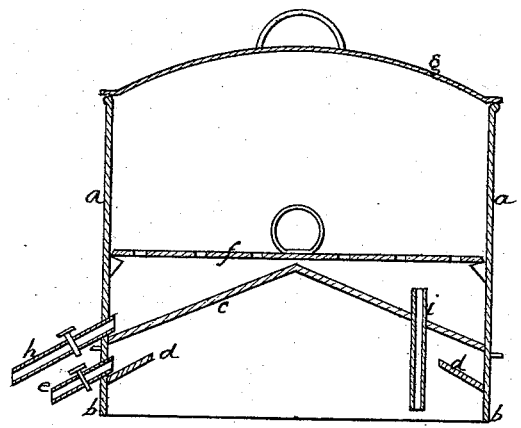

UNITED STATES PATENT OFFICE.

GEORGE W. LANE, OF PORTLAND, MAINE, ASSIGNOR TO HIMSELF AND JOHN ALLES, OF BOSTON, MASSACHUSETTS.

Letters Patent No. 111,067, dated January 17, 1871.

IMPROVEMENT IN COMBINED STEAMERS AND CONDENSERS.

The Schedule referred to in these Letters Patent and making part of the same.

*To all whom it may concern:*

Be it known that I, GEORGE W. LANE, of Portland, in the county of Cumberland and State of Maine, have invented a new and useful Combined Steamer and Condenser; and I do hereby declare the following to be a full, clear, and exact description thereof, which will enable others to make and use my invention, reference being had to the accompanying drawing forming part of this specification, in which is shown a sectional view of my invention.

My invention has relation to the combination of a condenser, made as herein described, with a steamer for steaming articles of food.

The condenser is to be used for preparing or evaporating fresh water from salt or sea-water, and is for use on ship-board.

It is my aim to produce a cheap and simple one for use on the smaller kinds of vessels.

I use it with an ordinary kettle, the condenser being set down into the kettle for that purpose.

$a\ a$ are the walls of the condenser.

$b$, the part of fitting down into the kettle.

$c$ is the condensing-surface.

$d$, the receptacle for the products of condensation. This runs around the inner periphery of the cylinder formed by the walls $a$ at the point shown in the drawing.

$e$ shows the tube to lead the condensed water into any proper receptacle from $d$.

$f$ is the steamer with its perforations.

$g$, the cover thereof.

$h$, a tube to draw off the cool water put in on the top of the condenser.

$i$, a tube to lead water from over the condenser down into the kettle when the water therein is low or becoming exhausted.

The operation is as follows:

The condenser is placed in the top of a kettle (not shown in the drawing) and fire applied to the kettle, which is resting on a ship's stove for instance.

The steam rises and striking the condenser $c$ is condensed, and the water running down the concave faces of $c$ drops into $d$, and is then led off by $e$ to a receptacle prepared to receive it.

Cool water placed above, on the convex surface of $c$, will hasten the process of condensation, and when the water in the kettle becomes low a fresh supply can be introduced by means of the tube $i$, which will conduct the same into the kettle, and thus relieve the necessity of lifting off the condensing device to supply the kettle.

When the water above the condenser becomes warm and steam rises therefrom, articles placed on the steamer $f$ can be kept warm and be steamed.

The steamer $f$ is removable by its ring, as shown.

The water can be drawn off from above the condenser through the tube $h$. This device can be kept on the stove in a vessel, and so fresh water be conveniently obtained at all times.

The walls $a$ form a cylinder which is occupied in its interior by the steamer $f$ and by the concave condenser $c$.

What I claim as my invention, and desire to secure by Letters Patent, is—

The combination of the walls $a$, cover $g$, steamer $f$, condenser $c$, tubes $h\ e\ i$, and rim $d$, to be used as herein set forth.

G. W. LANE.

Witnesses:
   WM. HENRY CLIFFORD,
   HENRY C. HOUSTON.